H. I. CHASE, P. F. CHASE, & E. D. CHASE.
Grain-Elevators.
No. 6,228. Reissued Jan. 12, 1875.
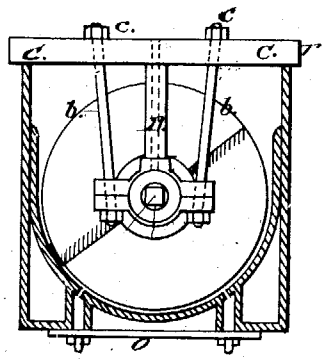
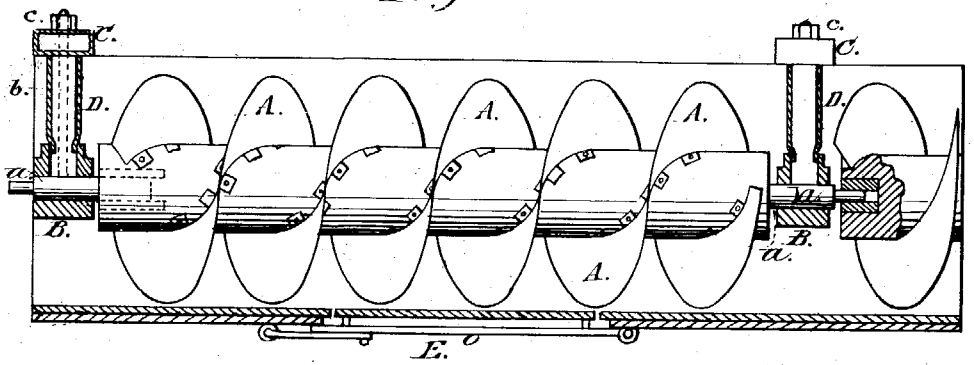
Witnesses:
M. Gardner
W. D. Chase
Inventors:
Henry I. Chase
Philander F. Chase
Edwin D. Chase
per their Attorney
G. B. Fowles

UNITED STATES PATENT OFFICE.

HENRY I. CHASE, PHILANDER F. CHASE, AND EDWIN D. CHASE, OF PEORIA, ILLINOIS.

IMPROVEMENT IN GRAIN-ELEVATORS.

Specification forming part of Letters Patent No. 138,994, dated May 20, 1873; reissue No. 6,228, dated January 12, 1875; application filed January 6, 1875.

DIVISION B.

*To all whom it may concern:*

Be it known that we, HENRY I. CHASE, PHILANDER F. CHASE, and EDWIN D. CHASE, of the city of Peoria, in the county of Peoria and State of Illinois, have invented certain new and useful Improvements in Grain-Conveyers; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 is a longitudinal sectional elevation of our improved conveyer. Fig. 2 is an end view.

Like letters in both figures of the drawing indicate like parts.

This invention consists of a continuous spiral conveyer, having the journals of its shaft arranged in journal-boxes suspended from the upper part of a conveyer by means of adjustable brace-rods, so as to allow a free passage to the grain along the bottom of the trough, the said rods being arranged so that they can be adjusted to keep the conveyer centrally in the trough; also, in adjustable keys provided with oil-passages, in combination with cross-braces attached to the sides of the conveyer-trough and the journal-boxes, so as to keep the covers of the latter down in place, and at the same time furnish convenient means for oiling the boxes; also, in providing the trough with a polished metallic lining, in combination with the conveyer, so as to facilitate the passage of the grain through the trough, the bottom thereof being provided with a door, through which the grain is discharged, as will be hereinafter more fully explained.

A is the continuous spiral conveyer, having the journals *a*, at each end of its shaft, in journal-boxes B, suspended from the cross-braces C by means of the rods or braces *b b*, having their lower ends attached to the ends of the journal-boxes, and their upper ends passed through the cross-braces, and provided with screw-threads to receive the screw-nuts *c c*. The said cross-braces are made to embrace the sides of the conveyer-trough firmly, so as to prevent the trough from spreading. D D are the keys, having an oil-passage through the center of each. The lower end of each key rests in a recess in the cover of each journal-box, the upper end passing through the cross-brace, and provided with a stopper, and held firmly in place by a wedge or screw. In case the cross-braces should be dispensed with, the keys will be screwed into the covers of the journal-boxes. The trough is lined with polished sheet metal and provided with a door, E, through which the grain is discharged.

The operation is as follows: With those conveyers supported by pillars set in the bottom of the trough the grain settles around the pillars, and will mix with other kinds of grain handled in the same conveyer, thus causing great inconvenience to the operator; but, by suspending the conveyer from the top of the trough, no impediment is offered to a free passage of the grain through the same.

The adjustable braces can be raised or lowered on either side to keep the shaft of the conveyer rigidly in the center of the trough, so as to counteract any unequal pressure of the grain upon one side or the other of the conveyer-shaft, thus facilitating the passing of the grain through the conveyer.

The keys furnish convenient means for oiling the journal-boxes, the oil-entrance being above the top of the trough and out of the way of the grain; and at the same time they hold the covers of the boxes in place, and also act as auxiliary stays or braces to the support of the journal-boxes.

Having thus fully described our invention, what we claim therein as new, and desire to secure by Letters Patent, is—

1. The continuous spiral grain-conveyer, having the journals of its shaft arranged in journal-boxes suspended from the top of a conveyer-trough by means of brace-rods, so as to allow a free passage of the grain along the bottom of the trough, substantially as set forth.

2. The combination of the adjustable keys D D, journal-boxes B B, and spiral grain-conveyer shaft, substantially as and for the purpose set forth.

3. The combination of the cross-braces C C, adjustable suspension-rods *b b*, journal-boxes B B, screw-nuts *c c*, adjustable keys D D, journals *a a* of conveyer-shaft, and conveyer-trough, substantially as set forth.

4. The conveyer-trough having a polished sheet-metal lining, and provided with the door E, in combination with the continuous spiral grain-conveyer A, substantially as set forth.

In testimony that we claim the foregoing we have hereunto set our hands this 2d day of January, 1875.

HENRY I. CHASE.
PHILANDER F. CHASE.
EDWIN D. CHASE.

Witnesses:
M. GARDNER,
W. S. CHASE.